(12) United States Patent
Hofer et al.

(10) Patent No.: US 9,520,586 B2
(45) Date of Patent: Dec. 13, 2016

(54) BATTERY MODULE

(71) Applicant: Lisa Dräxlmaier GmbH, Vilsbiburg (DE)

(72) Inventors: Guido Hofer, Weng (DE); Bernhard Wallner, Velden (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 326 days.

(21) Appl. No.: 14/065,989

(22) Filed: Oct. 29, 2013

(65) Prior Publication Data

US 2014/0120407 A1 May 1, 2014

(30) Foreign Application Priority Data

Oct. 29, 2012 (DE) ........................ 10 2012 219 783

(51) Int. Cl.
*H01M 2/20* (2006.01)
*H01M 2/10* (2006.01)
*H01M 2/02* (2006.01)

(52) U.S. Cl.
CPC ........... *H01M 2/206* (2013.01); *H01M 2/1077* (2013.01); *H01M 2/0217* (2013.01)

(58) Field of Classification Search
CPC ........ H01M 2/202; H01M 2/20; H01M 2/204; H01M 2/206; H01M 2/1077
See application file for complete search history.

(56) References Cited

U.S. PATENT DOCUMENTS

| 3,647,556 | A | 6/1970 | Cox | |
|---|---|---|---|---|
| 3,937,636 | A | 2/1976 | Slautterback | |
| 2008/0050645 | A1* | 2/2008 | Kai | B60L 11/1861 429/61 |
| 2008/0118819 | A1* | 5/2008 | Gamboa | H01M 2/0245 429/61 |
| 2008/0284375 | A1* | 11/2008 | Nagaoka | B60L 11/1855 320/116 |
| 2009/0258282 | A1* | 10/2009 | Harada | H01M 10/625 429/61 |
| 2009/0282672 | A1 | 11/2009 | Puester et al. | |
| 2010/0047682 | A1* | 2/2010 | Houchin-Miller | H01M 2/1077 429/120 |

(Continued)

FOREIGN PATENT DOCUMENTS

DE 2309505 A1 10/1973
DE 3631203 A1 3/1988
(Continued)

*Primary Examiner* — Miriam Stagg
*Assistant Examiner* — Brian Ohara
(74) *Attorney, Agent, or Firm* — Finnegan, Henderson, Farabow, Garrett & Dunner LLP

(57) ABSTRACT

A battery module includes a battery module housing, a plurality of battery cells accommodated in the battery module housing and electrically interconnected, a first connecting piece forming a first voltage polarity that is conductively connected to one of the battery cells, and a second connecting piece forming a second voltage polarity that is conductively connected to another one of the battery cells. The battery module housing includes a passage at each of at least three occupiable spots. The first connecting piece is arranged in one of the passages. The second connecting piece is arranged in another one of the passages.

16 Claims, 7 Drawing Sheets

(56) References Cited

U.S. PATENT DOCUMENTS

| | | | | |
|---|---|---|---|---|
| 2010/0316906 A1* | 12/2010 | Nansaka | ............. | H01M 2/0262 |
| | | | | 429/181 |
| 2011/0024205 A1* | 2/2011 | Nishihara | ............. | H01M 10/48 |
| | | | | 180/65.1 |
| 2011/0269008 A1* | 11/2011 | Houchin-Miller | .. | B60L 11/1874 |
| | | | | 429/120 |
| 2012/0034507 A1* | 2/2012 | Harada | ............... | B60L 11/1874 |
| | | | | 429/120 |
| 2012/0094164 A1* | 4/2012 | Wuensche | .......... | H01M 2/1061 |
| | | | | 429/100 |
| 2012/0231316 A1* | 9/2012 | Sohn | ................... | H01M 10/613 |
| | | | | 429/120 |
| 2012/0244404 A1* | 9/2012 | Obasih | ................. | B60L 3/0046 |
| | | | | 429/99 |

FOREIGN PATENT DOCUMENTS

| | | |
|---|---|---|
| WO | WO 2008/106641 A1 | 9/2008 |
| WO | WO 2008/153602 A1 | 12/2008 |

* cited by examiner

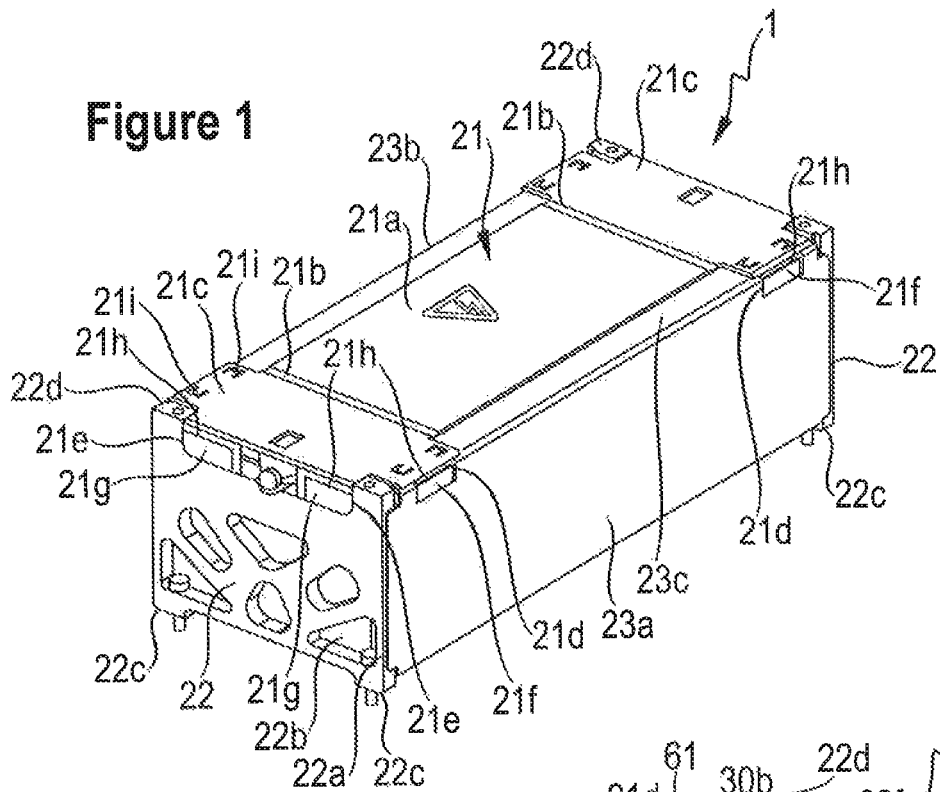

BATTERY MODULE

CROSS-REFERENCE TO RELATED APPLICATIONS

This application is based upon and claims the benefit of prior German Application No. 10 2012 219 783.4, filed on Oct. 29, 2012, the entire content of which is incorporated herein by reference.

TECHNOLOGY FIELD

The disclosure relates to a battery module and, more particularly, to a rechargeable battery module for use in a motor vehicle, such as an electric motor vehicle, for supplying electrical energy to an electro motor for operating the motor vehicle.

BACKGROUND

WO 2008/106641 A1 and WO 2008/153602 A1 describe battery modules having a housing in which a plurality of electrically interconnected battery cells are arranged.

In a conventional battery module, positions of external electrical connections, i.e., plus and minus poles, are specified. If a plurality of such battery modules are arranged on a carrier structure, such as an undercarriage of a motor vehicle, the poles of the battery modules are interconnected by means of bus bars that are designed such that they connect the poles accordingly. Long bus bars are often required for this purpose, which have to be guided around the housing, for example, and have a complex geometrical structure.

SUMMARY

In accordance with the disclosure, there is provided a battery module for a system that needs a plurality of battery modules, with the battery module being constructed in such a manner that a plurality of battery modules can be arranged and interconnected side-by-side efficiently and requiring as little space as possible. Also in accordance with the disclosure, there is provided a system with battery modules that can be interconnected efficiently and require a minimum space.

The battery module consistent with embodiments of the disclosure includes a box-shaped or a prismatic-shaped battery module housing that accommodates a plurality of battery cells. The battery module housing may be developed in multiple parts, for example. The battery module housing may have a first lateral wall and a second lateral wall, and a first end wall and a second end wall. The first and second lateral walls may be arranged approximately parallel to each other. The first and the second end walls connect the first and second lateral walls at opposite ends of the lateral walls, for example, on the face. In this way, an enclosure that is quadrangular, such as rectangular, in cross-section, is formed. In some embodiments, the lateral walls are longer than the end walls. In some embodiments, the lateral walls and the end walls are equal in length, thus making the enclosure quadratic. In some embodiments, the lateral walls may be screwed or welded to the end walls, such as using laser welding. The lateral walls and the end walls may be made at least partially of a metallic material, such as, for example, an aluminum material. The lateral walls may be made of a sheet-shaped metal wrought material, for example. The lateral walls may also be developed as pressure plates and/or plate-shaped. The lateral walls may be connected to a base that forms the base of the battery module and/or the battery module housing. For example, the base and the first and second lateral walls may be formed of a sheet metal, such as, for example, an aluminum sheet, with the lateral walls being angled at about 90° relative to the base. In some embodiments, each of the lateral walls forms a bending edge, resulting in a battery module housing part having a U-shaped cross-section.

Consistent with embodiments of the disclosure, the battery module housing has a base that is connected to the lateral walls and closes a bottom side of the battery module. In some embodiments, the lateral walls and the base are made of a metal sheet, such as an aluminum sheet, bent into a U-shape. The lateral walls may also be formed of an aluminum material.

The battery module housing may have a cover at its topside. The cover may be formed or developed, for example, of a synthetic material, such as a thermoplastic synthetic material. The cover prevents the battery cells, as well as connections between the battery cells, from external access. The cover may be formed in such a manner, for example, that it closes or can close an opening, in particular an access opening, at the first and/or the second lateral wall and the first end wall or the second end wall.

The battery cells may be arranged in alignment. The battery cells are electrically interconnected, for example, in parallel and/or in series. In some embodiments, the battery cells are prismatic or ashlar-shaped battery cells, and a thickness of a battery cell is smaller than a height and/or width of the batter cell. In some embodiments, a plurality of battery cells are aligned in a direction of thickness, i.e., in direction of the cell thickness, for example, along the longitudinal direction of a gas channel or along the first and/or second lateral wall. Each of the battery cells has a positive electrical connection (plus pole) and a negative electrical connection (minus pole), which are, for example, arranged on a common area of the prismatic or ashlar-shaped battery cell. The connections may also be referred to as terminals or connection terminals. In some embodiments, the connections may be weld connections or screw connections made of metal, such as, for example, a copper material or an aluminum material. One of the electrical connections of the battery cell may be arranged closer to the first lateral wall than the other electrical connection of the battery cell, with the other electrical connection being arranged closer to the second lateral wall. In some embodiments, the electrical connections may point in the direction of the top or toward the cover.

As mentioned above, the battery housing may have two lateral walls and two end walls, with the end walls connecting the ends of the two lateral walls. In some embodiments, the end walls may be screwed or welded to the lateral walls. In some embodiments, the end walls may include pressure plates. The battery module housing may therefore have four edges. An edge is where an end wall meets a lateral wall.

At least the two lateral walls and the two end walls form a lateral border that encloses the aligned battery cells, i.e., the stack of battery cells.

The battery module comprises a first connecting piece, which forms a positive electrical battery module connection and is conductively connected to at least one of the battery cells. Furthermore, the battery module comprises a second connecting piece, which forms a negative electrical battery module connection and is conductively connected to at least one of the battery cells. In some embodiments, the battery cells of the battery module are conductively interconnected between the first connecting piece and the second connecting piece, such as, for example, in parallel and/or in series. That is, each battery cell may be connected in series with another battery cell, or may be connected in parallel with one or more other battery cells and then the battery cells connected in parallel may be connected in series with other batter cells. For example, one battery cell may be connected to a next battery cell in series. In another example, two battery cells connected in parallel may be connected in series with next two battery cells connected in parallel. In yet another example, three battery cells connected in parallel may be connected in series with next three battery cells connected in parallel. In yet another example, four battery cells connected in parallel may be connected in series with next four battery cells connected in parallel. This series may be continued at will. In some embodiments, identically charged poles of battery cells connected in series are arranged on a same side, for example, on a broadside of the battery cell. In some embodiments, identically charged poles of battery cells connected in parallel may be positioned on opposite sides, for example, on broadsides of the battery cells. In this way, a plurality of battery cells are interconnected in parallel and/or in series via a relatively simple, elongated, such as straight, bus bar. The longitudinal direction of the bus bar may, for example, be substantially parallel to the direction in which the battery cells are aligned.

In some embodiments, the first connecting piece and the second connecting piece are configured to be connected by a conductive connection element, such as, for example, an external bus bar or an external cable with, for example, a screw- or weld-connection. The connection element, which may not be a part of the battery module, may connect the battery module to another battery module or another electrical component, such as the drive motor, for example.

In some embodiments, the battery module or the battery module housing may accommodate a first or second connecting piece in one of at least three different spots, such as four different spots. These different spots may be accommodation spots. For each spot, the battery module housing has at least one passage. The first connecting piece is arranged at one of the at least three different spots, and the second connecting piece is arranged at another one of the at least three different spots. The first connecting piece and the second connecting piece may each be electrically connected to or contacted by the external connection element, such as the bus bar or the cable, via the passage. In some embodiments, the passage is formed by a passage opening. The passage may also optionally include a passage opening closure, which closes the passage opening and is removable from the passage opening to open the passage. In some embodiments, the passage opening is already sufficiently prepared so that only the existing optional passage opening closure has to be removed from its position closing the passage opening. In developments without passage opening closure, or if the passage opening closure has been removed, the passage opening forms the passage.

The first connecting piece and/or the second connecting piece are at least partially arranged within the battery module housing. In some embodiments, the first connecting piece and/or the second connecting piece are completely arranged within the battery module housing. In some embodiments, the first connecting piece and/or the second connecting piece are arranged in such a manner to prevent at least an inadvertent access to the connecting pieces, which prevents a short circuit because the connecting pieces are then protected by the housing and are not exposed. Access to the first or second connecting piece may be achieved via the passage opening where the respective connecting piece is arranged.

The passage opening of the passage may allow a part of the connecting piece to extend from an interior of the battery module or the battery module housing outward, i.e., into a vicinity or an exterior of the battery module or the battery module housing. Alternately, the passage may allow the external connection element, which may not be associated with the battery module, to extend from the vicinity or the exterior of the battery module or the battery module housing into the interior of the battery module housing.

Because the battery module housing has at least three different spots that may be occupied by a first connecting piece or a second connecting piece, battery modules arranged side-by-side or adjacent battery modules may be electrically connected via a relatively short path or a relatively short connection element that extends through the passage opening at which the respective connecting piece is arranged. With respect to their battery module housings, the battery modules may be constructed essentially the same. For example, a connecting piece of a first battery module may be conductively connected to a connecting piece of a second battery module by means of the connection element, with the connection element being affixed or contacted at the connecting pieces. The connection element may then extend through a passage opening of the first battery module and through a passage opening of the second battery module.

Also in accordance with the disclosure, there is provided a system that includes a plurality of battery modules, such as a first and a second battery modules. In some embodiments, besides the first and second battery modules, the system also includes a third or even more battery modules, with two battery modules, such as the first and second battery modules, being arranged such that a passage of one of the two battery modules is located opposite a passage of the other one of the two battery modules. Each of such opposite passages may be associated with one of the occupiable spots that are occupied or populated by a connecting piece. As a result, the connecting piece of the one of the two battery modules may be connected, such as in a direct path, to the connecting piece of the other one of the two battery modules by means of a connection element that is shortened as compared to a connection element according to the conventional technology. The connection element, e.g., the cable or the bus bar that connects the battery modules, does not require any complicated geometries. Moreover, this is economical with respect to weight and cost as well as installation space, and at the same time, the electrical resistance is decreased. Furthermore, the relatively short connection element also increases the safety of the system comprising a plurality of battery modules, because the risk of a short circuit, even during an accident, is reduced.

In some embodiments, the spots of the battery module that are occupiable by the first and second connecting pieces are formed in the area of the edges where the end walls meet the lateral walls, or in the area of the corners, where the end walls, the lateral walls, and the cover meet. In some embodiments, a respective spot for occupation by a connecting piece may be formed on at least three of the four edges or corners, such as at each of the four edges or corners. The battery module housing is therefore adapted so that each pole may be represented on at least three or every corner or edge of the battery module and/or the battery module housing, in particular because of the respective different arrangement and/or interconnection of the battery cells within the battery module.

The first connecting piece may be arranged at a first and/or second battery cell of the aligned battery cells, and the second connecting piece may be arranged at a last and/or a second-to-last battery cell of the aligned battery cells or the battery cell stack. For example, the first battery cell may be arranged at or in the area near the first end wall, and the last battery cell may be arranged at or in the area near the second end wall.

In some embodiments, two passages may be formed on the battery module housing for each spot prepared for a connecting piece. In some embodiments, for each spot prepared for a connecting piece, a passage may be directed to the side with the lateral wall, and another passage may be directed to the side with the end wall.

In some embodiments, at least three of the following four occupiable spots are provided:
 a first occupiable spot having a passage directed toward the side with the first lateral wall and/or a passage directed toward the side with the first end wall,
 a second occupiable spot having a passage directed toward the side with the first lateral wall and/or a passage directed toward the side with the second end wall,
 a third occupiable spot having a passage directed toward the side with the second lateral wall and/or a passage directed toward the side with the first end wall, and
 a fourth occupiable spot having a passage directed toward the side with the second lateral wall and/or a passage directed toward the side with the second end wall.

The passage may have a recess that forms the passage opening and is formed in the first lateral wall, the second lateral wall, the first end wall, or the second end wall, depending on which passage it is or to which one of the sides the passage is directed.

If a plurality of battery modules are aligned with one lateral wall of a battery module facing one lateral wall of a neighboring battery module, the passages located at corresponding lateral walls would opposite to, and particularly be in line with, one another. If a plurality of battery modules are aligned with one lateral wall of a battery module facing one lateral wall of a neighboring battery module, the passages located at corresponding end walls would opposite to, and particularly be in line with, one another. In some embodiments, one battery module is arranged relative to another battery module in such a manner that the lateral wall of the one battery module faces the end wall of the other battery module. In such an arrangement, a passage located at the lateral wall of the one battery module would opposite to, and particularly be in line with, a passage located at the end wall of the other battery module.

In some embodiments, each of the passages is covered by means of a removable passage opening closure that is fastened to the cover or the lateral or end wall of the battery module housing, before the battery module is connected to another battery module. The passage opening closure may be removed far enough from the passage, for example by means of cutting off or grinding off or simple folding over, so that it opens up the passage opening of the passage. In some embodiments, the passage opening closure is attached to the cover or the lateral wall or end wall of the battery module housing by means of a predetermined breaking point. If the cover has a foldable section, the passage opening closure is arranged at the foldable section. The removable passage opening closure facilitates the removal of the passage opening closure at the spots where access to the respective connecting piece is needed. The other passage openings may therefore remain closed by their respective passage opening closures. In some embodiments, at least one passage opening closure, or only one or a single passage opening closure is removed at the spots that are occupied by a connecting piece.

The cover of the battery module housing, which is made of, for example, synthetic material, may have a main section and at least one foldable section that is foldable relative to the main section. The foldable section is connected to the main section, for example, by means of a hinge, such as a film hinge. The main section is attached, for example, at the battery module firmly or in such a manner that it would not be readily removed from the battery module. The at least one foldable section may be swiveled back and forth between an opened position and a closed position. In the opened position, the foldable section allows access into the interior of the battery module from the top side of the battery module, while in the closed position, the foldable section prevents access from the top side of the battery module. In some embodiments, the cover may have one, two, three, or four such foldable sections. In some embodiments, the at least one foldable section may include the passage opening closure(s) for the at least one passage opening. For example, the foldable section includes the at least one passage opening closure of the passage or the passage opening which are associated with the at least one spot that the foldable section covers.

In some embodiments, a foldable section may cover at least three, for example four, occupiable spots. In some embodiments, a foldable section may cover two occupiable spots. In some embodiments, a foldable section may cover one, i.e., a single occupiable spot.

In some embodiments, the foldable section may have, for example, a springy snap element, which snaps into, for example, the lateral wall, so that the foldable section is held in its closed position, and may be opened with an increased exertion of force. In some embodiments, the cover may expose at least one, for example two, of the occupiable spots by folding the corresponding foldable section upward, or close the spots by folding the corresponding foldable section downward. In some embodiments, the foldable section may cover the two occupiable spots of the first end wall. In some embodiments, the cover may have two such foldable sections, with one foldable section covering the occupiable spots on the first end wall, and the other foldable section covering the occupiable spots on the second end wall.

In some embodiments, the connecting piece includes a first connection structure and a second connection structure, where the first and the second connection structures are configured to be connected, for example, with the connection element that connects the battery module, for example by means of a screw-, plug-, or snap-connection, or a weld connection.

The first connection structure is accessible via a passage at one of the lateral walls and the second connection structure is accessible via a passage at one of the end walls.

The first connection structure may be arranged in the projection or line of the passage of the lateral wall, and the second connection structure may be arranged in the projection or line of the passage of the end wall.

In some embodiments, the first and/or the second connecting piece is formed by a respective bus bar that conductively connects at least two battery cells of the battery module. Since the bus bar is already available for connecting battery cells in parallel, the connecting piece may have already been formed by the bus bar, i.e., the first connection structure and the second connection structure are formed at the bus bar that connects the battery cells. For example, the connection structure may be a boring through which a fastening screw that fastens the connection element to the connecting piece extends. Furthermore, the connection structure may be a screw bolt that is attached to the connecting piece and extends through a boring of the connection element, with the connection element being pressed against the connecting piece by a nut screwed onto the screw bolt. For example, the connection structure may be plug-in connector. For example, the connection structure may be a groove formed at the bus bar, or a separating gap formed at the bus bar, into which the connection element is positioned and welded to the bus bar.

In some embodiments, multiple battery modules are arranged in a line such that for at least one of the multiple battery modules, the battery module connections need to be arranged on opposite sides. However, sometimes due to the number, interconnection, and/or arrangement of the battery cells in that battery module, such an arrangement of battery module connections may not be achieved with the configurations discussed above. In such scenarios, a crossing bus bar may be needed. Due to the aligned arrangement of the prismatic battery cells in the direction of their thickness, the two connections of each battery cell are located on a first and a second lines, such as straight lines, that are spaced apart from each other. Such lines or straight lines extend along, for example, the thickness direction of the battery cells or the longitudinal direction of the lateral walls. In some embodiments the battery module includes a crossing bus bar that is fastened to a connection located on the first line and a connection located on the second line, and conductively connects these two connections, where these two connections belong to different battery cells. In some embodiments, the crossing bus bar includes a first section, a second section, and a crossing section connecting the first and second sections. The first section is fastened to the connection located on the first line, and the second section is fastened to the connection located on the second line. For example, the first section may connect two or more battery cells in parallel, and the second section may connect two or more other battery cells in parallel, with the crossing section interconnecting in series the battery cells connected in parallel by the first and second sections. In some embodiments, the crossing bus bar is made of, for example, a metal sheet, such as an aluminum material sheet or a copper material sheet, or punched out of a zinc coated copper sheet. In some embodiments, the crossing bus bar may be screwed or welded to the connection terminals of the battery cells.

Since a crossing bus bar is provided, the first connecting piece, which forms the positive electric battery module connection, for example, may be arranged on the first line, and the second connecting piece, which forms the negative electric battery module connection, for example, may be arranged on the first or second line.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 1 shows a battery module according to an exemplary embodiment.

FIG. 2 shows a battery module with a cover removed, according to an exemplary embodiment.

DESCRIPTION OF THE EMBODIMENTS

Figure 3:
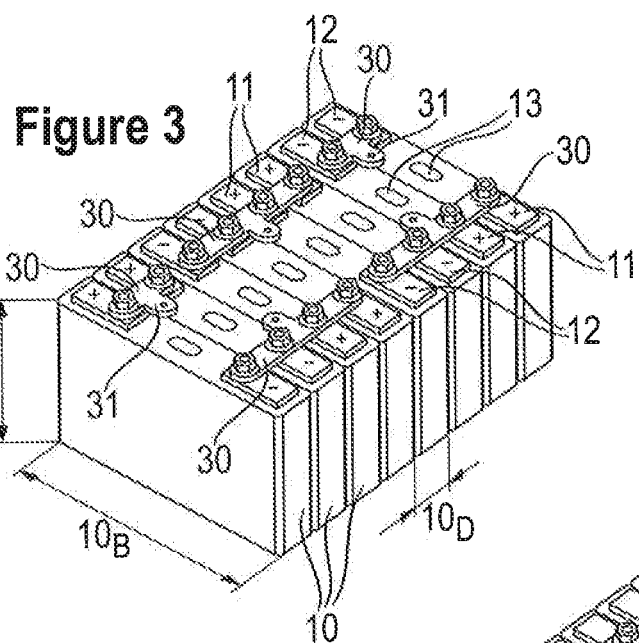
FIG. 3 shows battery cells aligned and connected by means of bus bars, according to an exemplary embodiment.

FIGS. 1 and 2 show a battery module 1 according to embodiments of the disclosure. The battery module 1 includes a battery module housing 20, which has a housing cover 21 and an enclosure 22, 23a, 23b. The enclosure 22, 23a, 23b is formed by a metal sheet bent into U-shape and two end walls 22 (i.e., a first and a second end walls 22). The bent metal sheet forms a base 24 and first and second lateral walls 23a, 23b. The first and second lateral walls 23a, 23b are arranged approximately parallel to one another. The two end walls 22 are approximately parallel to each other and which close the lateral walls 23a, 23b at their opposite face ends and therefore connect the lateral walls 23a, 23b to one another. The first and second end walls 22, which may be pressure plates, are welded to the lateral walls 23a, 23b, for example, by means of laser welding. Alternately, the end walls 22 may be screwed or glued to the lateral walls 23a, 23b. The end walls 22 and/or the lateral walls 23a, 23b and the base 24 may be made of an aluminum material.

The first and second lateral walls 23a, 23b are formed by legs of a metal sheet bent into U-shape, with the base 24 connecting the two lateral walls 23a, 23b. The lateral walls 23a, 23b are bent at an approximately right angle relative to the base 24 so that a respective bending edge is formed between the first lateral wall 23a and the base 24, and between the second lateral wall 23b and the base 24. At a top of the battery module 1, each of the lateral walls 23a, 23b is edged by approximately 90° to form an edged section 23c, which may point toward the respective other lateral wall 23a or 23b. The edged sections 23c may be substantially parallel to the base 24, for example.

The cover 21 may be made of synthetic material. A main section 21a of the cover 21 is fastened to the lateral walls 23a, 23b, for example, at the edged sections 23c.

The cover 21 includes foldable sections 21c at both ends adjacent to the end walls 22. Each of the foldable sections 21c is connected to the main section 21a by a film hinge 21b. Each of the foldable sections 21c may be swiveled back and forth between an open position and a closed position. The closed position is shown in FIG. 1. A swivel axis of each of the foldable section 21c is, for example, substantially parallel to the end walls 22. By folding up the foldable sections 21c, access to a first or second connecting piece 30a or 30b is opened up from the top of the battery module 1 or from the side of the cover 21. Therefore, when the cover 21 is in an open position, an external connection element 70 (not shown in FIGS. 1 and 2 but in some other figures, such as FIGS. 11 and 12), which is not part of the battery module 1, may be fastened to a fastening bolt 62 of the first or second connecting piece 30a or 30b, to conductively connect the battery module 1, for example, to another battery module 1. A screw nut 61 may be screwed onto the fastening bolt 62, and the external connection element 70 may be clamped between the screw nut 61 and the connecting piece 30a or 30b. When in the closed position, the foldable section 21c prevents access to the connecting piece 30a or 30b from the top or from the cover side. The main section 21a prevents access to bus bars 30 arranged in the battery module 1, reducing the risk of a short circuit caused inadvertently access by, for example, assembly personnel.

The first and second end walls 22 of the battery module 1 allow a plurality of battery modules 1 to stack on top of one another (see also FIG. 16), with the end walls 22 of an upper battery module 1 resting on the end walls 22 of a lower battery module 1. As a result, a weight of the upper battery module 1 is born by the end walls 22 of the lower battery module 1, and the lateral walls 23a, 23b of the lower battery module 1 are essentially unstressed. The base 24 of the upper battery module 1 may contact the top, such as the cover 21 or the edged sections 23c of the lower battery module 1. However, there may be a very small gap between the upper battery module 1 and the lower battery module 1 to ensure that the upper battery module 1 and its end walls 22 are supported on the end walls 22 of the lower battery module 1.

Each of the first and second end walls 22 has on its top side at least one upper floor spacer 22d, and on its lower side at least one lower floor spacer 22c. In some embodiments, such as the one shown in FIGS. 1 and 2, each of the first and second end walls 22 has two upper floor spacers 22d and two lower floor spacers 22c. That is, in total four upper floor spacers 22d and four lower floor spacers 22c are shown in FIGS. 1 and 2, which are arranged in the corners of the top and in the corners of the bottom of the box-shaped battery module 1. When multiple battery modules 1 are stacked, an upper battery module 1 and its lower floor spacers 22c may be positioned on the upper floor spacers 22d of a lower battery module 1 so that the lower floor spacers 22c of the upper battery module 1 contact the upper floor spacers 22d of the lower battery module 1. The upper battery module 1 may be screwed into the lower battery module 1, for example, so as to form a stable unit of a plurality of battery modules 1.

A distance between a lower floor spacer 22c and a corresponding upper floor spacer 22d of an end wall 22 may be greater than or equal to a height of a remaining part of the battery module 1. In some embodiments, the upper floor spacers 22d are offset relative to the cover 21 with respect to height. As shown in FIG. 1, the upper floor spacers 22d are offset upward relative to the cover 21. Alternatively, the upper floor spacers 22d may be offset downward relative to the cover 21. Similarly, the lower floor spacers 22c are offset relative to the base 24 with respect to height. As shown in FIG. 1, the lower floor spacers 22c are offset downward relative to the base 24. Alternatively, the lower floor spacers 22c may be offset upward relative to the base 24. According to embodiments of the disclosure, offsetting the upper floor spacers 22d and the lower floor spacers 22c as shown in FIG. 1, or in alternative manners consistent with embodiments of the disclosure, such as those discussed above, is fine as long as the distance between a lower floor spacer 22c and a corresponding upper floor spacer 22d is greater than the height of the remaining part of the battery module 1. For example, if the upper floor spacer 22d is offset downward relative to the cover 21 for a certain amount, the lower floor spacer 22c may also be offset downward relative to the base 24 for at least that certain amount. The same applies in the reverse case, i.e., if the lower floor spacer 22c is offset upward relative to the base 24 for a certain amount, the upper floor spacer 22d may also be offset upward above the cover 21 for at least that certain amount.

Figure 4:
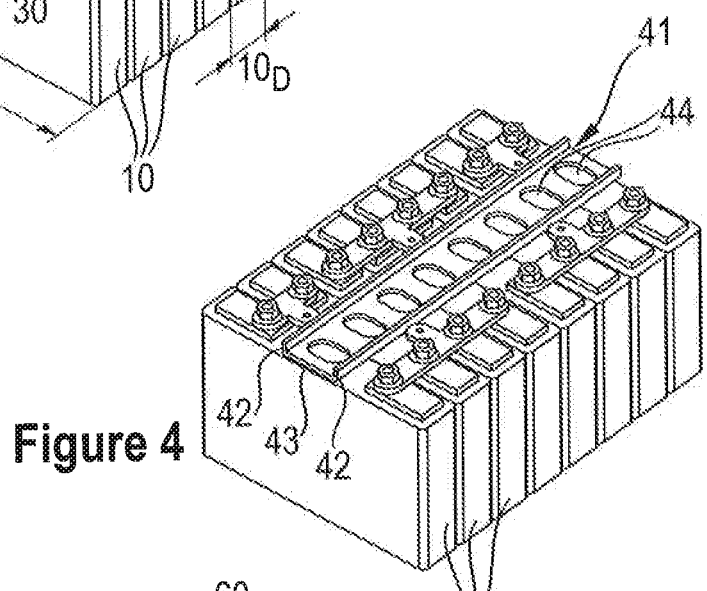
FIG. 4 shows aligned battery cells with an inserted U-profile for a gas channel, according to an exemplary embodiment.
Figure 5:
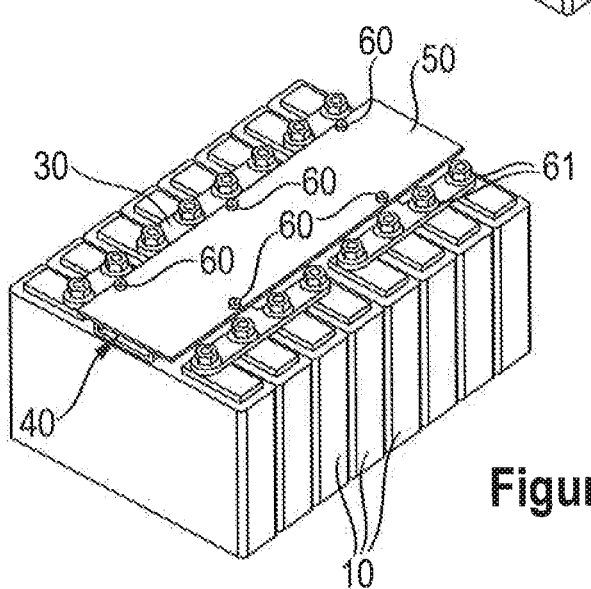
FIG. 5 shows aligned battery cells with a printed board that closes the U-profile and is screwed to the bus bars, according to an exemplary embodiment.

FIGS. 3-5 show a plurality of battery cells 10 accommodated in the module housing 20. As shown in FIG. 3, the plurality of battery cells 10 are aligned in a direction of thickness 10D. The battery cells 10 each have a prismatic shape and are also referred to as prismatic battery cells 10. Each battery cell 10 has a positive electrical connection terminal 11 and a negative electrical connection terminal 12, which are arranged on a common side of the battery cell 10. Between the positive and negative terminals 11, 12, each battery cell 10 has a gas outflow opening 13 where an overpressure valve is formed, which may open and allow gas to flow out of the battery cell 10 if an impermissibly high overpressure is generated in the battery cell 10, for example, if a so-called "thermal runaway" occurs.

The thickness 10D of each battery cell 10 may vary based on certain parameters, such as, for example, a charging state, a temperature, and an age of the battery cell 10. The thickness 10D of the battery cell 10 is therefore variable in operation. In some embodiments, in the battery module 1, the aligned battery cells 10 are compressed or packed with bias in the direction of thickness 10D of the battery cells 10 by the end walls 22. The end walls 22 are developed as pressure plates, and are welded to the lateral walls 23 so that the battery cells 10 are supported by the battery module housing 20, for example, by the end walls 22, with bias. The battery module housing 20 keeps the battery cells 10 together even if they tend to expand, such as during charging, for example. This ensures that the battery module 1 essentially always retains a same external dimensions, regardless of the charging state of the battery cells 10.

In the example shown in FIG. 3, the battery module 1 has twelve battery cells 10, with two respective cells 10 being connected in parallel and connected in series with two adjacent cells 10 connected in parallel.

As shown in FIGS. 3-5, the connection terminals 11, 12 of the battery cells 10 are screw connections. In other embodiments, the connection terminals 11, 12 may be welding connections. The connection terminals 11, 12 have threaded stud bolts onto which a respective nut 61 is screwed, as shown in, e.g., FIG. 5. A bus bar 30 is clamped between the nut 61 and the connection terminal 11 or 12. The bus bar connects at least two adjacent battery cells 10, for example, in parallel and/or in series. In the example shown in FIGS. 3-5, two respective adjacent battery cells 10 are connected in parallel, and then connected in series with next two battery cells 10 connected in parallel. For this purpose, the bus bar 30 contacts two negative electrical connection terminals 12 and two positive electrical connection terminals 11, for example, with a screw connection or a weld connection.

The connection terminals 11, 12 of the aligned battery cells 10 are aligned along a first line and a second line. In some embodiments, the first and second lines are straight lines spaced apart and extending along the first and second lateral wall 23a, 23b, respectively, or along the direction in which the battery cells 10 are aligned. The first line is closer to the first lateral wall 23a and the second line is closer to the second lateral wall 23b. For two battery cells 10 that are connected in parallel by a bus bar 30, their positive electrical connection terminals 11 are arranged on a same one of the first and second lines, and their negative electrical connection terminals 12 are arranged on another same one of the first and second lines. For two battery cells 10 that are connected in series by a bus bar 30, their positive electrical connection terminals 11 are arranged on the first and second lines, respectively, and their negative connection terminals 12 are also arranged on the second and first lines, respectively.

As is shown in, e.g., FIG. 2, the battery module housing 20 have four different spots that may be occupied by a connecting piece 30a or 30b. The four spots are arranged in the area of the edges or borders where a lateral wall 23a, 23b meets an end wall 22, to accommodate a first or second connecting piece 30a or 30b. For each occupiable spot, the battery module housing 20 has two passages, of which one runs or points to the side with the lateral wall 23a or 23b and the other to the side with the end wall 22. Therefore, the battery module housing 20 has four occupiable spots, i.e.:
- a first occupiable spot having a passage directed toward the first lateral wall 23a and a passage directed toward the first end wall 22,
- a second occupiable spot having a passage directed toward the first lateral wall 23a and a passage directed toward the second end wall 22,
- a third occupiable spot having a passage directed toward the second lateral wall 23a and a passage directed toward the first end wall 22, and
- a fourth occupiable spot having a passage directed toward the second lateral wall 23b and a passage directed toward the second end wall 22.

Each of the four passages directed to one of the lateral walls 23a, 23b includes a recess 21d (also referred to as a lateral access 21d) in the lateral wall 23a or 23b and the edged section 23c. The first and second occupiable spots each have a recess 21d at the first lateral wall 23a, and the third and fourth occupiable spots each have a recess 21d at the second lateral wall 23b.

Each of the four passages directed to one of the end walls 22 includes a recess 21e (also referred to as a face side access 21e) in the end wall 22. The first and third occupiable spots have a recess 21e at the first end wall 22, and the second and fourth occupiable spots each have a recess 21e at the second end wall 22. As used in this disclosure, the recesses 21d and 21e may also be referred to as passage openings 21d and 21e.

In the example shown in FIG. 2, only two of the four occupiable spots are occupied by a connecting piece 30a or 30b. As shown in FIG. 2, the first spot is occupied by the first connecting piece 30a and the second spot is occupied by the second connecting piece 30b. However, because of the four occupiable spots each having two passages directed to different directions, the battery module housing 20 may be used to interconnect the battery module 1 with another battery module 1 arranged near any side of the battery module 1. Furthermore, the battery module housing 20 allows for the connecting pieces 30a, 30b to be arranged at spots where there are short paths to an adjacent battery module 1 to conductively connect the adjacent battery module 1 to the battery module 1.

As shown in FIG. 1, the cover 21 includes two face side access closures 21g on each of the foldable sections 21c. Each of the face side access closures 21g closes one of the face side accesses 21e. The cover 21 also includes lateral access closures 21f, each of which closes one of the lateral accesses 21d. The access closures 21g, 21f are each arranged at the foldable section 21c by means of a predetermined breaking point 21h. Depending on which of the spots a connecting piece 30a or 30b is arranged and from which wall, i.e., an end wall 22 or a lateral wall 23a or 23b, an external bus bar, such as a bus bar connecting the battery module, is to be connected to the connecting piece 30a or 30b, the respective access closure 21f or 21g is removed, with the other unused accesses remaining or being closed by the corresponding access closures. As used in this disclosure, the access closures 21f and 21g may also be referred to as passage opening closures 21f and 21g.

The first connecting piece 30a and the second connecting piece 30b are each formed by a bus bar that conductively connects two battery cells 10, for example in parallel. Each of the connecting piece 30a, 30b is screw-connected to one connection terminal 11 or 12. In addition, each of the connecting piece 30a, 30b has a first tongue-shaped protrusion accommodated in a passage directed toward one of the end walls 22, and a second tongue-shaped protrusion approximately perpendicular to the first tongue-shaped protrusion and accommodated in a passage directed toward one of the lateral walls 23a, 23b.

The battery module 1 includes a gas channel 40 (FIG. 2). As shown in FIGS. 3-5, the gas channel 40 includes a U-profile 41 and a printed board 50 that forms or co-forms a module controller. The U-profile 41 includes two legs 42 that are connected by a connecting section 43. The side opposite to the connecting section 43 between the legs 42 is closed by the printed board 50. The connecting section 43 of the U-profile 41 has an opening 44 arranged over each of the gas outflow openings 13. As a result, gas flowing out of the battery cells 10 flows into the gas channel 40 and is guided along the gas channel 40. The longitudinal direction of the elongated gas channel 40 extends in the direction in which the battery cells 10 are aligned. In the example shown in FIG. 2, at each end of the gas channel 40 directed in the longitudinal direction, a respective transitional section 45 is formed in the area of an end wall 22 of the battery module 1. Each transitional section 45 forms a transition from a square cross-section of the gas channel 40 to a round cross-section of a connection. The gas channel 40 may be connected to an external line, i.e., a line that is not part of the battery module 1, by the round connection, so that gas may escape from the gas channel 40 and therefore from the battery module 1, and be guided to a suitable place. This prevents the gas from exiting the battery module 1 in an uncontrolled manner and possibly putting the occupants of the motor vehicle at risk.

Figure 8:
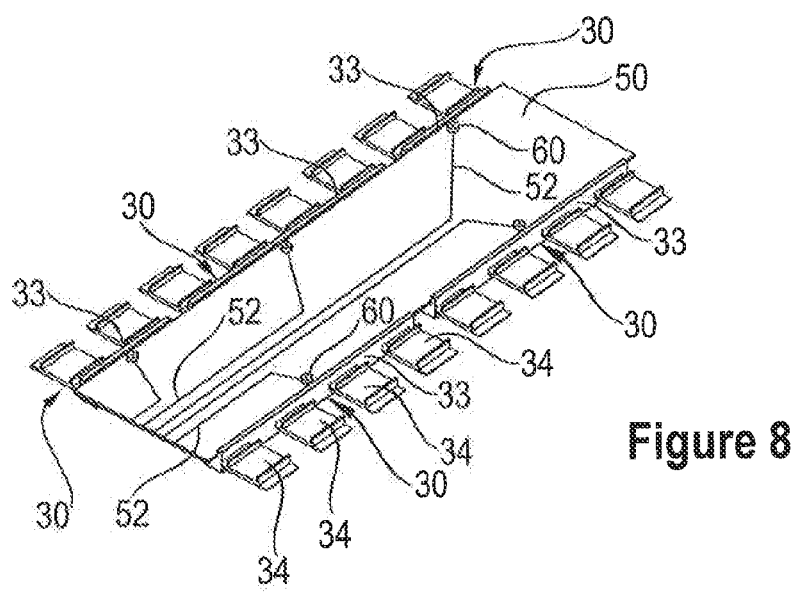
FIG. 8 shows a unit of a printed board and bus bars that are arranged at the sides of the printed board, in particular fastened by means of screw connections, according to an exemplary embodiment.

The printed board 50 has at least one track. As shown in FIG. 8, the printed board 50 has a plurality of tracks 52, which are arranged, for example, at the top of the printed board 50, i.e., the side that points away from the U-profile. Inasmuch as the printed board 50 comprises electronic components, the electronic components are also arranged at the top of the printed board 50.

The tracks 52 of the printed board 50 may be conductively connected to at least one electrical connection at the external side of the battery module 1, such as, for example, a plug-type connection, which may connect the tracks 52 of the printed board 50 to an external control device to monitor and/or control the battery module 1.

In the examples shown in FIGS. 1 to 8, the printed board 50 is fastened by means of a screw-type connection at the bus bars 30, which electrically interconnect the battery cells 10. Each track 52 of the printed board 50 is electrically connected with a bus bar 30. The track 52 arranged on the top side of the printed board 50 is connected to a through-connection and/or forms a through-connection that extends through an opening, such as a boring through which the screw 60 fastens the printed board 50 to the bus bar 30, to the other side of the printed board 50 where the printed board 50 contacts the bus bar 30. By fastening the printed board 50 to the bus bar 30 by means of a screw connection, the through-connection of the track 52 is simultaneously pressed against the bus bar 30, which decreases the resistance between the bus bar 30 and the track 52. For example, the through-connection may enclose the boring through which it reaches in an annular manner.

FIGS. 3 to 5 show a plurality of bus bars 30, which are screw-connected to the connection terminals 11, 12 of the battery cells 10. The connection terminals 11, 12 include stud bolts that extend through borings in the bus bars 30. The bus bars 30 are pressed against the connection terminals 11, 12 by means of nuts 61 screwed onto the stud bolts. The bus bars 30 each have a tab 31 that protrudes from the respective bus bar 30 in the direction directed to the connection terminals 11, 12 arranged on the other side. The tab 31 has a boring or tapped hole, or a stud bolt. The printed board 50 has borings that match the borings or the stud bolts of the tabs 31. The printed board 50 may be fastened to a thread of the bus bars 30 by means of screws 60, which extend through the borings of the printed board 50. Alternately, if the tabs 31 have stud bolts (not shown), the printed board 50 may be fastened to the bus bars 30 by nuts screwed onto the stud bolts.

Figure 6:
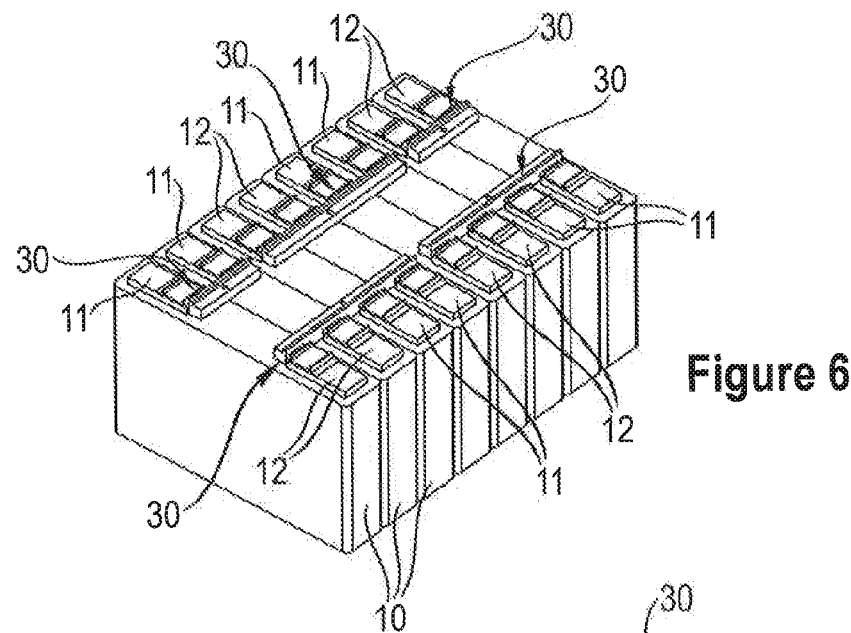
FIG. 6 shows aligned battery cells connected by means of bus bars, according to an exemplary embodiment.
Figure 7:
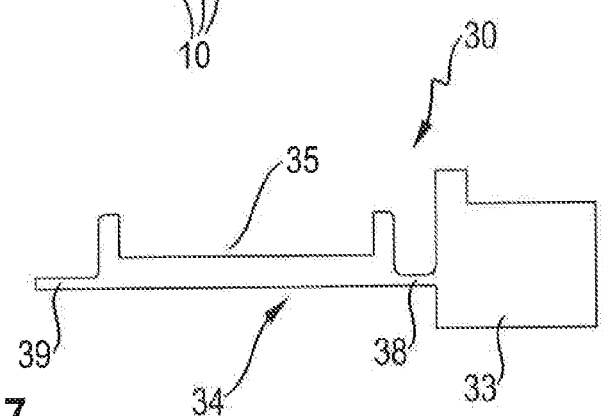
FIG. 7 is a cross-sectional view showing a bus bar according to an exemplary embodiment.
Figure 11:
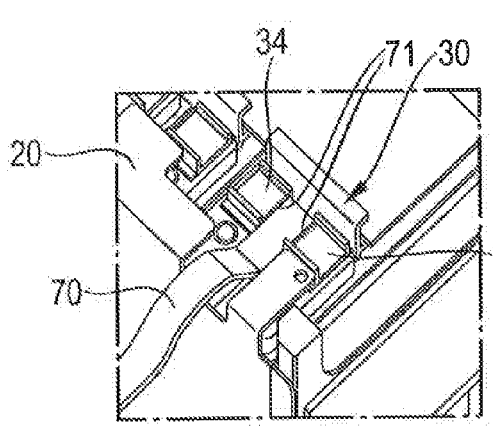
FIG. 11 shows a connection element that conductively connects two battery modules, which is arranged in a separating gap between two contact studs and welded to the two contact studs, according to an exemplary embodiment.
Figure 12:
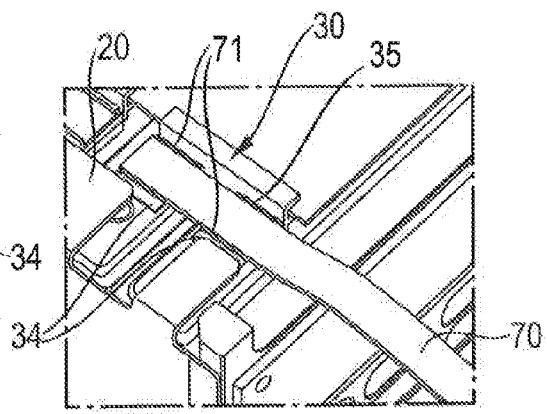
FIG. 12 shows a connection element that conductively connects two battery modules, which is arranged in a groove formed at the top of the contact studs and welded to the flanks of the groove, according to an exemplary embodiment.

FIGS. 6 to 12 show exemplary bus bars 30 for the battery module 1 shown in, for example, FIGS. 1 and 2. As shown in, e.g., FIG. 6, each bus bars 30 includes one or more contact tongues 34 protruding from an elongated bus duct 33. The contact tongues 34 allows attaching of an external connection element 70, which, for example, may electrically connect two battery modules 1, for example, in parallel or in series (FIGS. 11 and 12). The bus bars 30 shown in FIGS. 6 to 8 are different than the bus bars 30 shown in FIGS. 9 to 12 with respect to the fastening of the printed board 50 to the bus bars 30. In the examples shown in FIGS. 6 to 12, the connections 11, 12 of the battery cells 10 are welding connections.

As shown in FIGS. 6-12, each bus bar 30, which has, for example, an extruded profile, includes a plurality of contact tongues 34 that protrude from the bus duct 33. The number of contact tongues 34 corresponds to the number of battery cells 10 or their connections 11, 12 that are to be contacted by the bus bar 30. The bus bar 30 has one contact tongue 34 for each connection 11 or 12 to be contacted.

A separating gap is formed between adjacent contact tongues 34, which may be created by punching, for example. Each contact tongue 34 is connected to the bus duct 33 via a joint section 38 so that the contact tongue 34 may swivel elastically or plastically about a joint axis of the joint section 38. In some embodiments, the joint axis is approximately parallel to a longitudinal direction of the bus duct 33. The joint section 38 has a smaller thickness than the contact tongue 34. The contact tongue 34 includes a weld flange 39 on a free end of the contact tongue 34, where the free end faces away from the bus duct 33. A thickness of the weld flange 39 is less than that of other part of the contact tongue 34. The contact tongue 34 is welded to the connection terminal 11, 12 of the battery cell 10 by means of a welding process, such as a laser welding process, with a weld seam being, for example, parallel to the longitudinal direction of the bus duct 33 and/or the joint axis of the joint section 38. With such a structure of the bus bar 30 described above, differences in height between the connection terminals 11, 12 of the battery cells 10 connected by a joint bus duct 33 may be compensated. Furthermore, stress on the weld seam between the connection terminal 11, 12 and the contact tongue 34 caused by expansion or contraction of the battery cells 10 may be reduced.

The contact tongue 34 has on its top a groove 35 that is bordered laterally by two groove flanks and extends along the longitudinal direction of the bus duct 33. The groove 35 allows the positioning of a connection element 70 that is external of the battery module 10 in the groove 35 (FIG. 12). The connection element 70 may be a bus-bar-type or flat-material-type connection element welded to the contact tongue 34, for example by a laser welding process. To that end, a respective weld seam, such as a fillet weld, for example, may be established at the groove flanks. In some embodiments, the bus bar 30 is arranged in the battery module housing 20 in such a manner that the groove 35 is in an extension or in line with the passage that is directed to the side with the end wall 22.

Alternatively or in addition, a connection element 70 external to the battery module 1 may be positioned in the separating gap between adjacent contact tongues 34 (FIG. 11). The connection element 70 may be, for example, a bus-bar-type or a flat-material-type connection element welded to the bus bar 30, such as to the contact tongues 34 between which the separating gap is formed, for example by a laser welding process. For this purpose, a respective weld seam, such as a fillet weld, may be created at the contact tongues 34. In some embodiments, the bus bar 30 is arranged in the battery module housing 20 in such a manner that the separating gap is in an extension or line with the passage that is directed toward the side with the lateral wall 23a or 23b The width of the connection element 70 may approximately equal the width of the separating gap and the width of the groove 35 so that the connection element 70 may be positioned in the groove 35 or in the separating gap, as shown in FIGS. 12 and 11, respectively.

If the connection element 70 is positioned in the separating gap, it extends through the passage that points toward the side with the lateral wall 23a or 23b (FIG. 11). If the connection element 70 is positioned in the groove 35, it extends through the passage that points to the side with the end wall 22 (FIG. 12).

The bus bar 30 is a monolithic body and is formed with an extrusion profile, by punching out the gap between adjacent contact tongues 34. In some embodiments, the bus bar 30 is made of an aluminum material.

The bus bar 30, in particular the bus duct 33, is screwed to the printed board 50 in the embodiments shown in FIGS. 6 to 8, and is clamped to the printed board 50 in the embodiments shown in FIGS. 9 to 12. That is, in the embodiments shown in FIGS. 9 to 12, the printed board 50 is clipped to a lateral edge of the bus bar 30.

In the embodiments shown in FIGS. 6 to 8, the tapped holes for the screws 60 for fastening the printed board 50 are formed in the bus duct 33 in a separate step. The bus duct 33 includes a notch that extends in the longitudinal direction. A flank of the notch guides a longitudinal edge of the printed board 50. In some embodiments, notches of bus ducts 33 of corresponding bus bars 30 disposed on opposite sides of the battery module 1, particularly the flanks of these notches, form a border for the printed board 50. The border may laterally border or guide the printed board 50. The tapped hole for the screw-connection is arranged in the notch, for example at a base of the notch.

Figure 9:
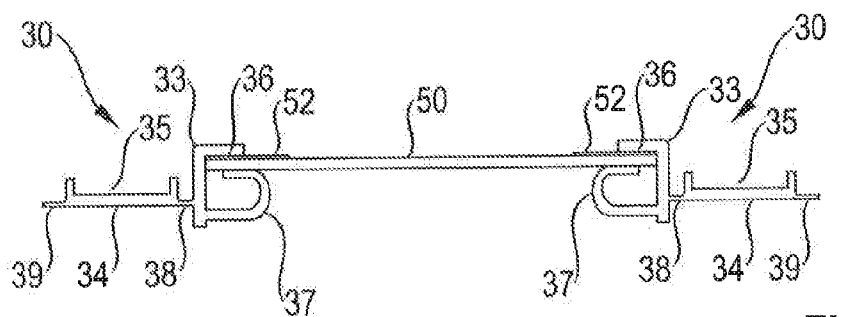
FIG. 9 is a cross-sectional view showing a unit of a circuit board and bus bars arranged at the sides of the circuit board, in particular affixed by means of a clamping connection, according to an exemplary embodiment.
Figure 10:
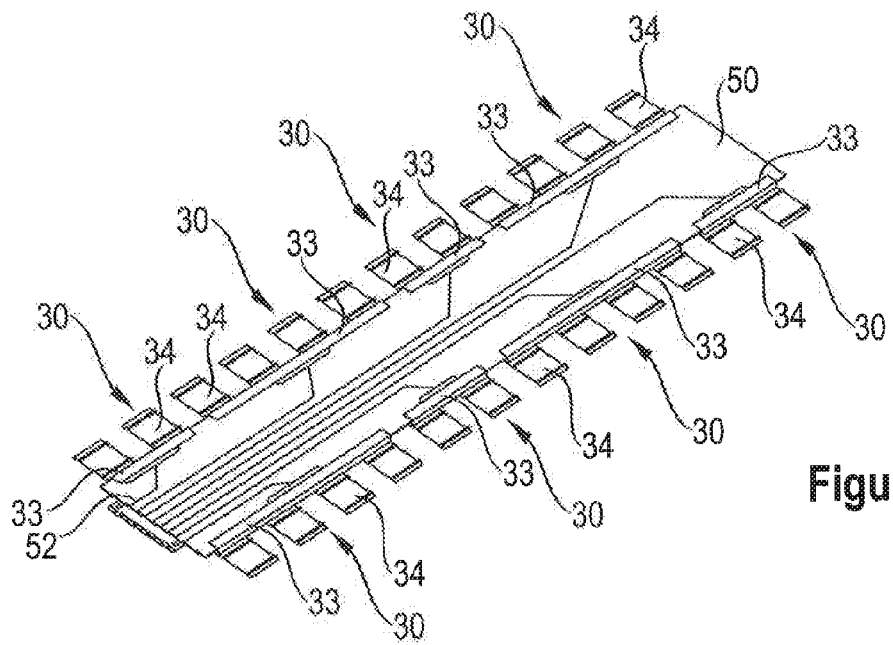
FIG. 10 is a perspective view corresponding to the cross-sectional view of FIG. 9.

In the embodiments shown in FIGS. 9 to 12, no tapped holes or notches are needed because the printed board 50 is clamped by the bus duct 33. The bus duct 33 has a clamp gap 36 that is formed between a clamp spring 37 and a counter-holder. The clamp spring 37 and the counter-holder may both be formed monolithically with the bus duct 33. The clamp spring 37 yields elastically, with a distance, i.e., the clamp gap 36 formed between the clamp spring 37 and the counter-holder. When the clamp spring 37 is in a relaxed state, the clamp gap 36 is smaller than a thickness of the printed board 50. When the printed board 50 is inserted into the clamp gap 36, the clamp spring 37 is tensioned, which causes the clamp gap 36 to widen so that it can accommodate the printed board 50 and press the printed board against the counter-holder. In some embodiments, a track 52 formed on the printed board 50 is pressed by the clamp spring 37 against the counter-holder, which causes the track 52 to come into conductive contact with the bus bar 30. The clamp spring 37 has a free end that yields elastically and presses, for example, against a lower side of the printed board 50. The clamp spring 37 protrudes from the bus duct 33, with the free end of the clamp spring 37 being bent, for example, by about 180°, so that the free end points toward the bus duct 33, as shown in FIG. 9. Alternatively, as shown in the cross-sectional view of FIG. 7 and discussed above, the bus bar 30 may be constructed in a simple manner from an extrusion profile.

Figure 13:
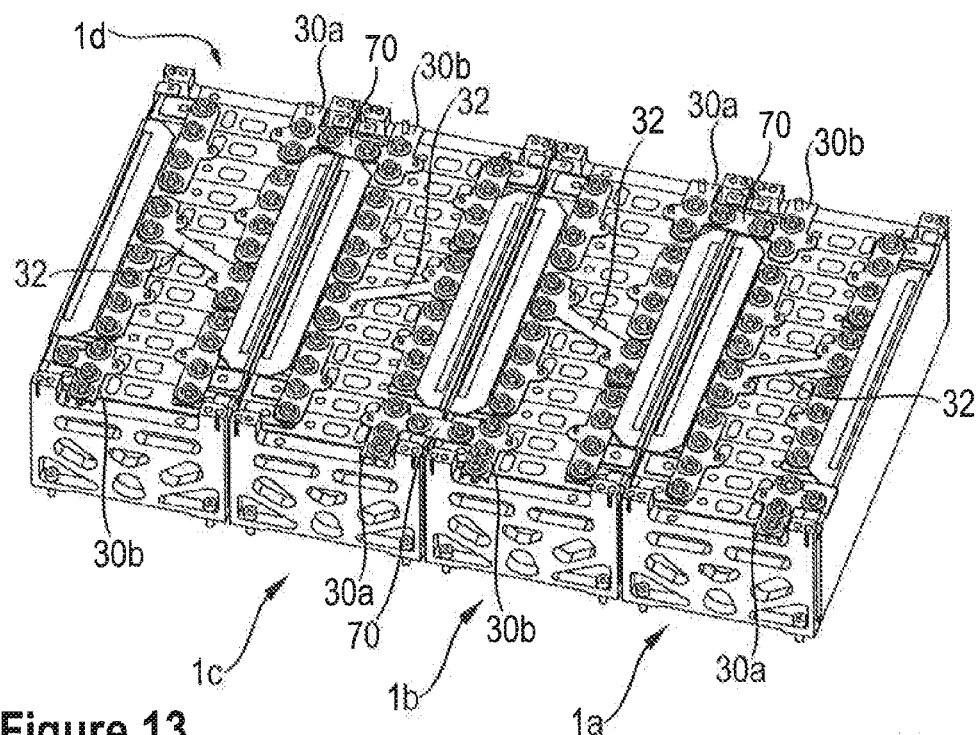
FIG. 13 shows a system with a plurality of battery modules arranged in alignment at their lateral walls, according to an exemplary embodiment.

FIG. 13 shows a system with a plurality of battery modules 1a-1d, with the plurality of battery modules 1a-1d being arranged in alignment with their lateral walls 23a, 23b, so that the lateral walls 23a, 23b of adjacent battery modules 1a-1d face each other. Like the battery module 1 shown in FIGS. 1 to 5, the battery modules 1a-1d shown in FIG. 13 may also include the modifications according to FIGS. 6 to 12.

As described above, the battery module housing 20 has two passages at the side with the first lateral wall 23a and two passages at the side with the second lateral wall 23b. The battery modules 1a-1d are arranged relative to one another such that at least one, for example two, passages of one of the battery modules 1a-1d are each located opposite to a passage of an adjacent one of the battery modules 1a-1d. That is, the opposite passages in two adjacent battery modules 1a-1d are in line with each other. The opposite passages may also be referred to as a passage pair. For each pair of adjacent battery modules, such as battery modules 1a and 1b, battery modules 1b and 1c, or battery modules 1c and 1d, a first passage pair and a second passage pair are formed.

As shown in FIG. 13, the connecting piece 30b of the battery module 1a is conductively connected to the connecting piece 30a of the adjacent battery module 1b by means of a rail-type or flat-material-type connection element 70 that extends through the recesses 21d of the two opposite passages that face each other, for example through the first passage pair. To allow the connection element 70 to extend through the recesses 21d of the two opposite passages, each of the lateral access closures 21f that correspond to the two opposite passages was removed by breaking it off at the predetermined breaking point 21h. Consistent with embodiments of the disclosure, since adjacent ones of the battery modules 1a-1d are arranged side by side and corresponding passages are thus close to each other, the length of the connection element 70 may be very short.

Each of the recesses 21d of the other passage pair, for example the second passage pair, is closed by means of the respective lateral access closure 21f and remains closed because no connection element 70 needs to extend through the second passage pair.

Based on the above description, one of ordinary skill in the art would recognize that if the system includes more than two battery modules 1 aligned side by side, for example, with a lateral wall 23a or 23b of one battery module 1 facing a lateral wall 23a or 23b of an adjacent battery module 1, the connecting pieces 30a and 30b of a battery module 1 sandwiched between two other battery modules 1 need to be arranged on different sides of that battery module 1, such as the battery module 1b or 1c shown in FIG. 13. For example, one of the connecting pieces 30a and 30b of that battery module 1b or 1c needs to be arranged on one of the lateral walls 23a and 23b, and the other one of the connecting pieces 30a and 30b needs to be arranged on the other one of the lateral walls 23a and 23b. Otherwise, the connection element 70 having a short length as shown in FIG. 13 cannot be used and a longer connection element may be needed. However, for a battery module 1 having twelve (12) battery cells 10 configured in a manner shown in FIG. 2, the connecting pieces 30a and 30b are arranged at a same side of the battery module 1. For example, the connecting pieces 30a and 30b are both arranged on a same one of the lateral walls 23a and 23b. In such a situation, a connection element longer than the connection element 70 shown in FIG. 13 may be needed for one of the connecting pieces 30a and 30b.

Therefore, for a system shown in FIG. 13, an interconnection configuration among the battery cells 10 that is different from that shown in FIG. 2 is needed. As shown in FIG. 13, each of the battery modules 1b and 1c has a crossing bus bar 32. The connecting pieces 30*a* and 30*b* of the battery module 1*b* or 1*c* can then be arranged at two diagonally opposite spots of the four occupiable spots. Although not necessary, the battery modules 1*a* and 1*d* arranged at peripheral of the system as shown in FIG. 13 may also have an interconnection configuration similar to that of the battery module 1*b* or 1*c*.

The crossing bus bar 32 includes a first section, a second section, and a crossing section connecting the first and second sections. The first section of the crossing bus bar 32 is fastened to at least one positive electrical connection terminal 11 located on the first line. The second section of the crossing bus bar 32 is fastened to at least one negative electrical connection terminal 12 located on the second line. Moreover, in the example shown in FIG. 13, the crossing bus bar 32 connects four neighboring battery cells 10 in a parallel-series manner, in which two neighboring battery cells 10 connected in parallel by the first section of the crossing bus bar 32 are further connected in series with two neighboring battery cells 10 connected in parallel by the second section of the crossing bus bar 32. At least one of the first section or the second section includes a fastening means similar to fastening means described above, such as a stud bolt or a tapped hole, to fasten the printed board 50, for example by means of a screw connection. The connection between the first section of the crossing bus bar 32 and the at least one positive electrical connection terminal 11, as well as the connection between the second section of the crossing bus bar 32 and the at least one negative electrical connection terminal may be, for example, screw connections or weld connections. For a weld connection, the first section and the second section may each have at least one or at least two contact tongues 34 (like those shown in FIGS. 6 to 8), which protrude from the first section or the second section and between which a separating gap is formed. Modifications to the crossing bus bar 32 are similar to those shown in FIGS. 6-8, 11, and 12. For example, of the crossing bus bar 32 may also include a joint section 38, a weld flange 39, or a groove 35.

The crossing bus bar 32 may be made out of a metal sheet, such as, for example, an aluminum or copper sheet.

Figure 14:
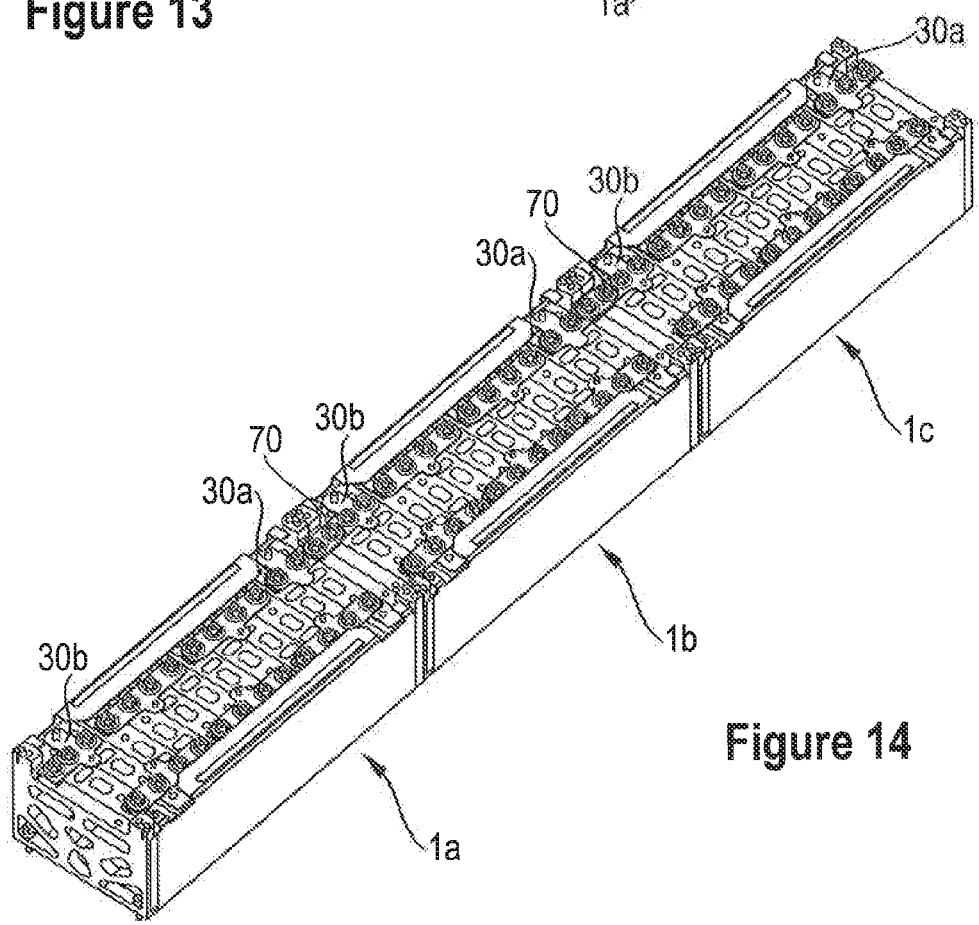
FIG. 14 shows a system with a plurality of battery modules arranged in alignment at their end walls, according to an exemplary embodiment.

FIG. 14 shows a system with a plurality of battery modules 1*a*-1*c*, with the plurality of battery modules 1*a*-1*c* being arranged in alignment with their end walls 22, so that the end walls 22 of adjacent battery modules 1*a*-1*c* face each another. Like the battery module 1 shown in FIGS. 1 to 5, the battery modules 1*a*-1*c* shown in FIG. 14 may also include the modifications according to FIGS. 6 to 12.

As described above, the battery module housing 20 has two passages at the side with the first end wall 22 and at the side with the second end wall 22. The battery modules 1*a*-1*c* are arranged relative to one another such that at least one, for example two, passages of one of the battery modules 1*a*-1*c* are each located opposite to a passage of an adjacent one of the battery modules 1*a*-1*c*. That is, the opposite passages in two adjacent battery modules 1*a*-1*c* are in line with each other. Similar to the system shown in FIG. 13, the opposite passages in FIG. 14 may also be referred to as a passage pair. For each pair of adjacent battery modules, such as battery modules 1*a* and 1*b* or battery modules 1*b* and 1*c*, a first passage pair and a second passage pair are formed.

As shown in FIG. 14, the connecting piece 30*b* of the battery module 1*a* is conductively connected to the connecting piece 30*a* of the adjacent battery module 1*b* by means of a rail-type or flat-material-type connection element 70 that extends through the recess 21*e* of the two opposite passages that face each other, for example through the first passage pair. To allow the connection element 70 to extend through the recesses 21*e* of the two opposite passages, each of the face side access closures 21*g* that correspond to the two opposite passages was removed by breaking it off at the predetermined breaking point 21*h*. Consistent with embodiments of the disclosure, since adjacent ones of the battery modules 1*a*-1*c* are arranged side by side and corresponding passages are thus close to each other, the length of the connection element 70 may be very short.

Each of the recesses 21*e* of the other passage pair, for example the second passage pair, is closed by means of the respective face side access closure 21*g* and remains closed because no connection element 70 needs to extend through the second passage pair.

The system shown in FIG. 14 includes three battery modules 1*a*-1*c* each having a configuration similar to the battery module 1 shown in FIG. 2. In the system of FIG. 14, a continuous interconnection of the battery modules 1*a*-1*c* with short connection elements 70 is possible. In this system, a crossing bus bar like the one used in the system in FIG. 13 is not needed in any one of the battery modules 1*a*-1*c*. Nevertheless, in some embodiments, the system shown in FIG. 14 may also include a crossing bus bar 32.

Whether a crossing bus bar 32 is required in a system consistent with embodiments of the disclosure depends on various factors, such as how battery cells 10 in a battery module 1 are interconnected and how battery modules 1 in a system are interconnected. It may also depend on the number of aligned battery cells 10 in a battery module 1, such as, for example, whether there are an even or an odd number of battery cells 10 in a battery module. For example, in a scenario that all aligned battery cells 10 in a battery module 1 are connected in series, if the number of the aligned battery cells 10 in a battery module 1 is an odd number, such as 7, 9, 11, 13, or 15, a crossing bus bar 32 is not necessarily required in a system where the battery modules 1 are arranged as shown in FIG. 13, i.e., where a lateral wall 23*a* or 23*b* of a battery module 1 faces a lateral wall 23*a* or 23*b* of a neighboring battery module 1. However, with all other parameters the same as those in the last example but if a system has an arrangement like that shown in FIG. 14, i.e., an end wall 22 of a battery module 1 in the system faces an end wall 22 of a neighboring battery module 1, a crossing bus bar 32 may be needed in at least one of the battery modules 1 in the system. On the other hand, if the aligned battery cells 10 in a battery module 1 are connected in series but the number of battery cells 10 in a battery module 1 is an even number, such as 6, 8, 10, 12, 14, or 16, then a crossing bus bar 32 may be needed in at least one of the battery modules 1 in a system having an arrangement of battery modules 1 similar to that shown in FIG. 13, but is not necessarily required in a system having an arrangement of battery modules 1 similar to that shown in FIG. 14.

In the last paragraph, scenarios in which all battery cells 10 in a battery module 1 are connected in series is discussed. In this paragraph, scenarios in which a battery module 1 has a parallel-series connection is discussed. In a parallel-series connection, more than one neighboring battery cells 10 are connected in parallel, and such battery cells 10 connected in parallel are then connected in series with other neighboring battery cells 10 that are connected in parallel. For example, in the battery modules 1 shown in FIGS. 2-14, two neighboring battery cells 10 are connected in parallel with each other, and then these parallel connected battery cells 10 are connected in series with other parallel connected battery cells 10. For example, if the number of battery cells 10 in a battery module 1 is an even number, such as 6, 8, 10, 12, 14, or 16, and if dividing that number of battery cells 10 by the number of respective parallel interconnected battery cells 10 yields an odd natural number (such as, for example, 14 divided by 2 equals 7; 10 divided by 2 equals 5; 12 divided by 4 equals 3), a crossing bus bar 32 is not necessarily required in a system having an arrangement of battery modules 1 similar to that shown in FIG. 13, whereas a crossing bus bar 32 may be needed in at least one of the battery modules 1 in a system having an arrangement of battery modules 1 similar to that shown in FIG. 14. Further, if the number of battery cells 10 is an even number, such as 6, 8, 10, 12, 14, or 16, and if dividing that number of battery cells 10 by the number of respective battery cells 10 interconnected in parallel yields an even natural number (such as, for example, 14 divided by 7 equals 2; 10 divided by 5 equals 2; 12 divided by 3 equals 4), a crossing bus bar 32 may be needed in at least one of the battery modules 1 in a system having an arrangement of battery modules 1 similar to that shown in FIG. 13, whereas a crossing bus bar 32 is not necessarily required in a system having an arrangement of battery modules 1 similar to that shown in FIG. 14.

Figure 15:
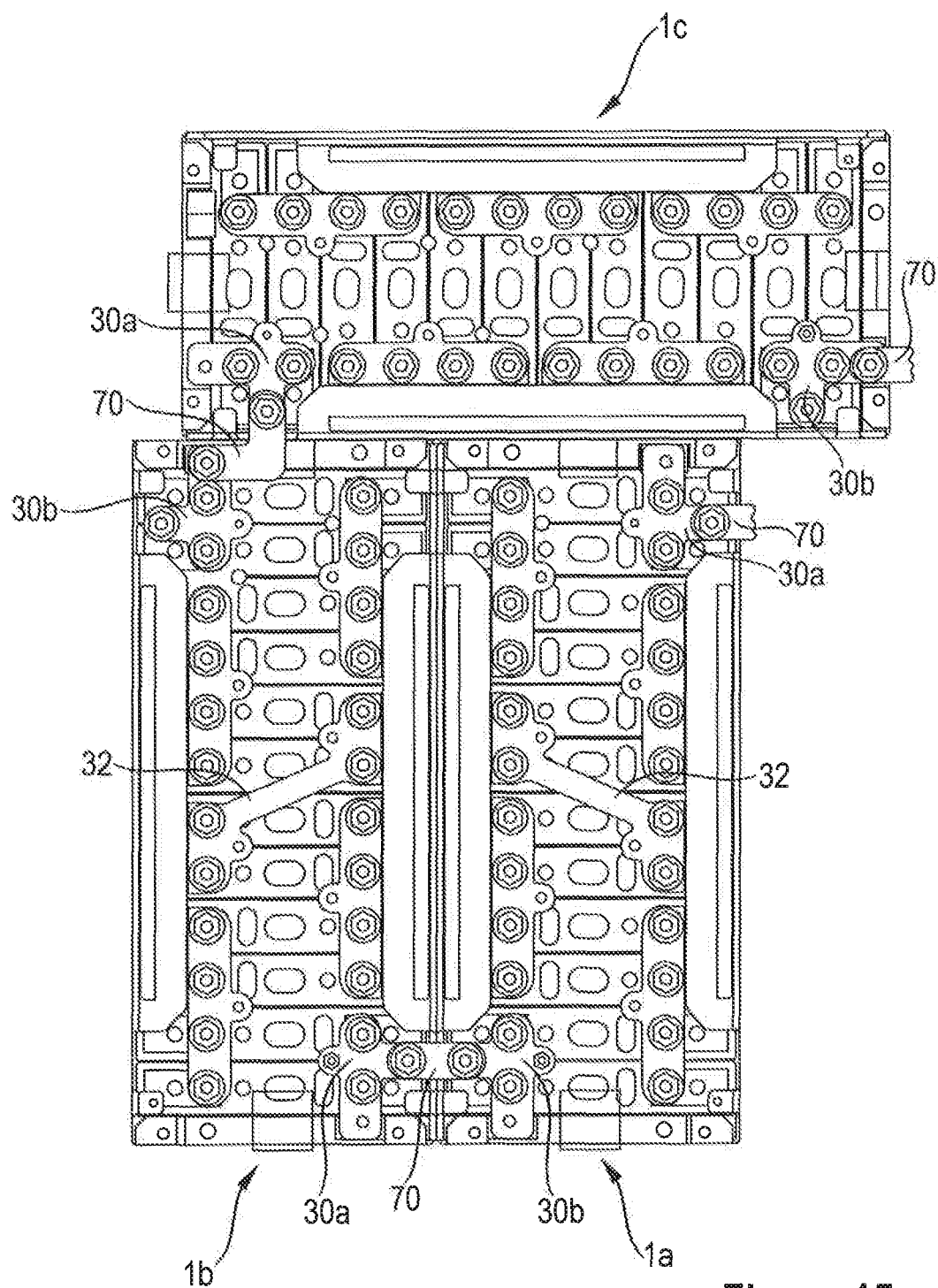
FIG. 15 shows a system with a plurality of battery modules arranged in alignment at their lateral and end walls, according to an exemplary embodiment.

FIG. 15 shows an exemplary arrangement in a system having a plurality of battery modules 1a-1c. The battery module 1b is arranged with its end wall 22 facing the lateral wall 23a or 23b of an adjacent battery module 1c. The passage of the battery module 1b that is directed to the side with the end wall 22 of the battery module 1b is located opposite the passage of the battery module 1c that is directed to the side with the lateral wall 23a or 23b of the battery module 1c, so that these opposite passages are in line with each other and form one passage pair. In the example shown in FIG. 15, the aligned battery modules 1b, 1c have one passage pair. The respective spots of the opposite passages are each populated with a connecting piece 30a or 30b, which are conductively connected by a simple connection element 70, such as a bus bar. As shown in FIG. 15, the connection element 70 has an angular shape.

As shown in FIG. 15, the battery module 1b is further arranged side by side with the battery module 1a where the lateral wall 23a or 23b of the battery module 1b faces the lateral wall 23b or 23a of the battery module 1a. A connecting piece 30a of the battery module 1b is connected to a connecting piece 30b of the battery module 1a via a connection element 70.

The system in FIG. 15 may further include a combination of the arrangements in FIGS. 13 and 14. That is, the system in FIG. 15 may include a plurality of battery modules 1, such as two, three, four, five or even more battery modules 1, aligned by their lateral walls 23a, 23b as shown in FIG. 13, and a plurality of battery modules 1, two, three, four, five or even more battery modules 1, aligned by their end walls 22 as shown in FIG. 14. At least one of the battery modules 1 aligned by their lateral walls 23a, 23b is conductively interconnected with at least one of the battery modules 1 aligned by their end walls 22, in a manner similar to that connecting the battery modules 1b and 1c shown in FIG. 15. Depending on the interconnection and positioning of the battery modules 1, and the interconnection of battery cells 10 within a battery module 1, one or more of the battery modules 1 in such a system may include a crossing bus bar 32.

Figure 16:
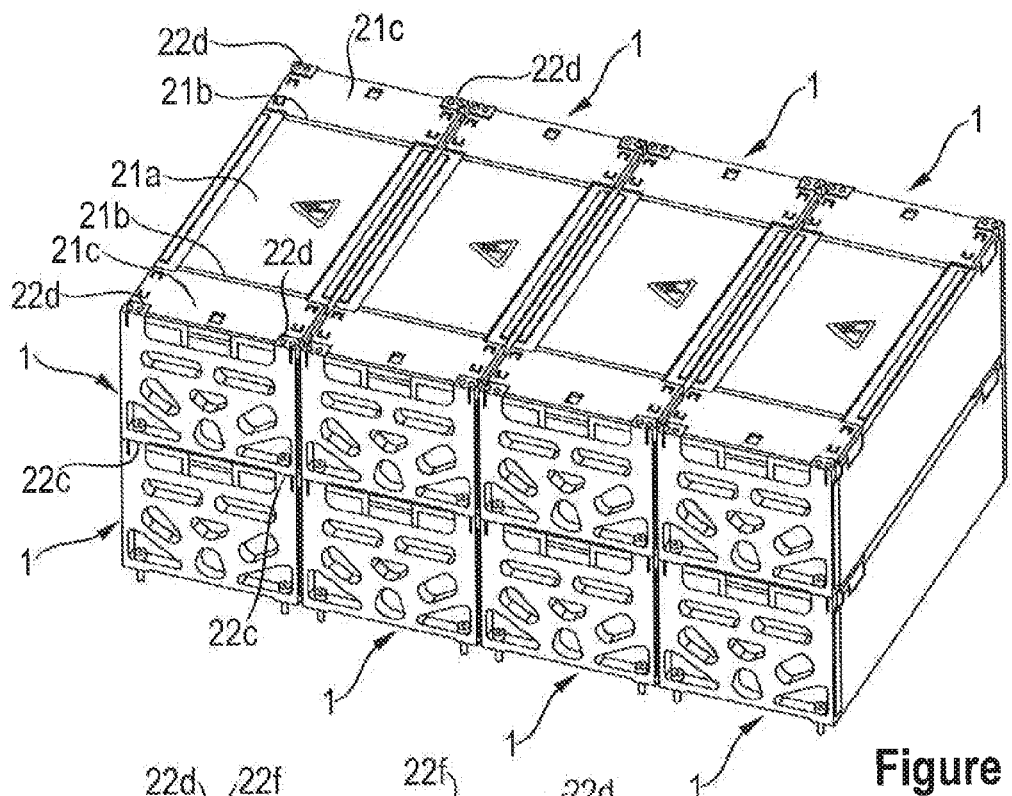
FIG. 16 shows a system comprising a plurality of battery modules arranged in a stacked manner and aligned at their lateral walls, according to an exemplary embodiment.

FIG. 16 shows an arrangement in a system with a plurality of battery modules 1. The battery modules 1 are stacked in the manner described above and aligned with their lateral walls 23a, 23b, resulting in a stack in the height of at least two battery modules 1 and a width of at least two, in the present example four, battery modules 1.

Representative for the end walls 22 of the battery module 1, an end wall 22 is described in greater detail with reference to the FIGS. 1, 2, 16, 17, and 18.

Figure 17:
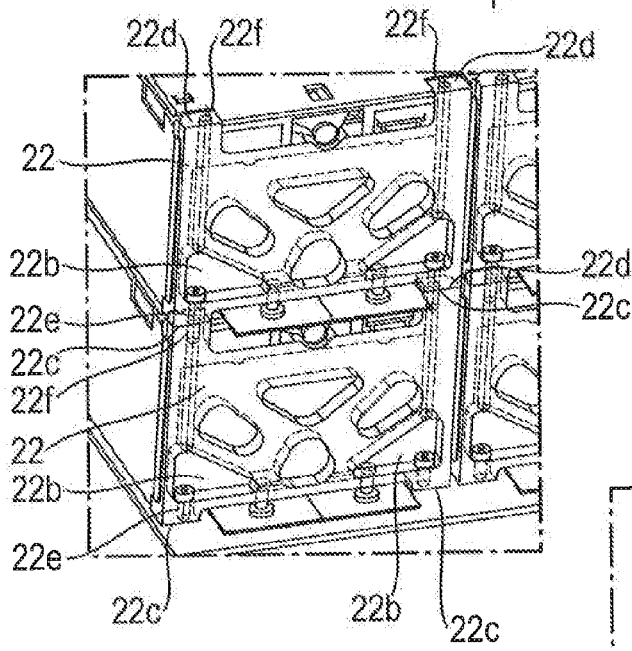
FIG. 17 is a detailed view showing a portion of the end wall of two stacked battery modules shown in FIG. 16.
Figure 18:
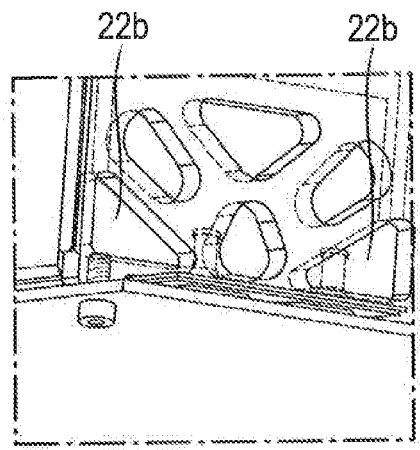
FIG. 18 is a detailed view showing a portion of the end wall shown in FIG. 17.

As shown in, e.g., FIG. 17, on a lower side of the end wall 22, at least one fastening boring, such as at least one lower tapped hole 22e (in the example shown in FIG. 17, two lower tapped holes 22e), is formed to fasten the battery module 1 to a carrier structure, such as a frame or an undercarriage, or another battery module 1 arranged underneath it. Similarly, on a top side of the end wall 22, at least one fastening boring, such as at least one upper tapped hole 22f (in the example shown in FIG. 17, two upper tapped holes 22f), is formed to fasten the battery module 1 to another battery module 1 arranged above it. The longitudinal axis of the upper tapped hole 22f is in line with the longitudinal axis of the lower tapped hole 22e. A recess 22b, such as a pocket-shaped or continuous recess 22b, is formed between the upper tapped hole 22f and the lower tapped hole 22e.

The lower tapped hole 22e extends through the lower floor spacer 22c. The upper tapped hole 22f extends through the upper floor spacer 22d. The end wall 22 has one upper tapped hole 22f per upper floor spacer 22d, and one lower tapped hole 22e per lower floor spacer 22c.

In some embodiments, the upper tapped hole 22f has a thread, and the lower tapped hole 22e has a thread. A thread diameter of the thread of the upper tapped hole 22f is smaller than a core diameter of the thread of the lower tapped hole 22e. Such a thread arrangement allows the battery module 1 to be optionally screwed down with its lower side, either to a carrier structure or to another battery module 1 arranged underneath it.

If the battery module 1 is screwed onto a carrier structure with its underside, a fastening screw having a nominal diameter of the thread of the lower tapped hole 22e may be screwed into the thread from the underside.

If the battery module 1 is screwed onto another battery module 1 arranged underneath it with its underside, a fastening screw with a nominal diameter of the thread of the upper tapped hole 22f may extend from the recess 22b through the lower tapped hole 22e of the upper battery module 1 and screwed into the thread of the upper tapped hole 22f of the lower battery module 1. The screw may be screwed in by means of a screw tool, for example, which is guided to the screw through the upper tapped hole 22f of the upper battery module 1.

For example, metric ISO threads can be used for this purpose, such as, for example, M6 for the upper thread and M8 for the lower thread, or M8 for the upper thread and M10 for the lower thread.

| List of Reference Symbols | |
| --- | --- |
| 1 | Battery module |
| 10 | Battery cell |
| $10_B$ | Cell width |
| $10_H$ | Cell height |
| $10_D$ | Cell thickness |
| 11 | Positive electrode/terminal |
| 12 | Negative electrode/terminal |
| 13 | Gas outflow opening |
| 20 | Battery module housing |
| 21 | Housing cover |
| 21a | Main section |
| 21b | Hinge/film hinge |
| 21c | Foldable section |
| 21d | Passage opening/recess |
| 21e | Passage opening/recess |

-continued

List of Reference Symbols

| | |
|---|---|
| 21f | Passage opening closure/access closure |
| 21g | Passage opening closure/access closure |
| 21h | Predetermined breaking point |
| 21i | Snap element |
| 22 | End wall/pressure plate |
| 22a | Weld seam/laser weld seam |
| 22b | Recess/pocket |
| 22c | Lower floor spacer |
| 22d | Upper floor spacer |
| 22e | Lower fastening boring/lower tapped hole/lower thread |
| 22f | Upper fastening boring/upper tapped hole/upper thread |
| 23a | First lateral wall |
| 23b | Second lateral wall |
| 23c | Edged section/edging |
| 24 | Base |
| 30 | Bus bar |
| 30a | First connecting piece |
| 30b | Second connecting piece |
| 31 | Tab |
| 32 | Crossing bus bar |
| 33 | Bus duct |
| 34 | Contact tongue |
| 35 | Groove |
| 36 | Clamping gap |
| 37 | Clamping spring |
| 38 | Joint section |
| 39 | Weld flange |
| 40 | Fluid channel/gas channel |
| 41 | U-profile |
| 42 | Legs/lateral legs |
| 43 | Connection section/connection tab |
| 44 | Opening |
| 45 | Transition section/transition piece |
| 50 | Board/printed board/controller |
| 51 | Boring |
| 52 | Track |
| 60 | Screw |
| 61 | Nut |
| 62 | Fastening bolt |
| 70 | Connection element |
| 71 | Weld seam |

What is claimed is:

1. A battery module comprising:
a battery module housing having at least three passages;
a plurality of battery cells accommodated in the battery module housing and electrically interconnected;
a first connecting piece forming a first voltage polarity that is conductively connected to one of the battery cells, the first connecting piece being arranged in one of the at least three passages and formed by a first bus bar that conductively connects two of the battery cells;
a second connecting piece forming a second voltage polarity that is conductively connected to another one of the battery cells, the second connecting piece being arranged at another one of the at least three passages and formed by a second bus bar that conductively connects other two of the battery cells; and
a gas channel formed by:
a U-profile component; and
a printed circuit board formed over the U-profile component, the printed circuit board:
being at least a part of a battery module controller,
being fastened at the first and second bus bars, and
including a plurality of tracks, where each track is electrically coupled to one of the first and second bus bars,
wherein:
the first connecting piece and the second connecting piece are arranged at least partially inside the battery module housing,
each of the at least three passages includes a passage opening connecting an interior of the battery module housing to an exterior of the battery module housing, and
a part of the first or the second connecting piece extends from the interior of the battery module housing to the exterior of the battery module housing through one of the passage openings, to be contacted by an external connection element.

2. The battery module according to claim 1, wherein the first connecting piece and the second connecting piece are arranged completely inside the battery module housing.

3. The battery module according to claim 1, wherein:
at least one of the at least three passages includes a removable passage opening closure covering the corresponding passage opening, and
the removable passage opening closure is fastened at a cover, a lateral wall, or an end wall of the battery module housing, by a predetermined breaking point.

4. The battery module according to claim 1, wherein:
the battery module housing includes two lateral walls and two end walls, and
the at least three passages are formed in an area of edges where the end walls meet the lateral walls.

5. The battery module according to claim 4, wherein:
the at least three passages are first passages, and
each first passage has a corresponding second passage formed nearby, where one of the first passage or the second passage is directed toward one of the two lateral walls and the other one of the first passage or second passage is directed toward one of the two end walls.

6. The battery module according to claim 1, wherein:
the battery cells are prismatic battery cells having a cell thickness, a cell height, and a cell width,
the cell thickness is smaller than the cell height, and
the battery cells are arranged in alignment in a direction of the cell thickness.

7. The battery module according to claim 1, wherein:
the battery module housing includes a cover made of a synthetic material, and
the cover includes a main section and a foldable section coupled to the main section, the foldable section being configured to swivel between a closing position and an opening position.

8. A system comprising a plurality of battery modules according to claim 1, wherein:
the battery modules are arranged side by side, and
one of the at least three passages of a first battery module of the battery modules is opposite to one of the at least three passages of a second battery module of the battery modules neighboring to the first battery module,
the system further comprising:
a connection element conductively connecting one of the first or second connecting piece of the first battery module and one of the first or second connecting piece of the second battery module.

9. A battery module comprising:
a battery module housing having at least three passages;
a plurality of battery cells accommodated in the battery module housing and electrically interconnected;
a first connecting piece forming a first voltage polarity that is conductively connected to one of the battery cells, the first connecting piece being arranged in one of the at least three passages and formed by a first bus bar that conductively connects two of the battery cells;
a second connecting piece forming a second voltage polarity that is conductively connected to another one of the battery cells, the second connecting piece being arranged at another one of the at least three passages and formed by a second bus bar that conductively connects other two of the battery cells; and a gas channel formed by:
- a U-profile component; and
- a printed circuit board formed over the U-profile component, the printed circuit board:
  - being at least a part of a battery module controller,
  - being fastened at the first and second bus bars, and
  - including a plurality of tracks, where each track is electrically coupled to one of the first and second bus bars, wherein:
- the first connecting piece and the second connecting piece are arranged at least partially inside the battery module housing,
- each of the at least three passages includes a passage opening connecting an interior of the battery module housing to an exterior of the battery module housing,
- at least one of the at least three passages includes a removable passage opening closure covering the corresponding passage opening, and
- the removable passage opening closure is fastened at a cover, a lateral wall, or an end wall of the battery module housing, by a predetermined breaking point.

10. The battery module according to claim 9, wherein the first connecting piece and the second connecting piece are arranged completely inside the battery module housing.

11. The battery module according to claim 9, wherein a part of the first or the second connecting piece extends from the interior of the battery module housing to the exterior of the battery module housing through one of the passage openings, to be contacted by an external connection element.

12. The battery module according to claim 9, wherein:
- the battery module housing includes two lateral walls and two end walls, and
- the at least three passages are formed in an area of edges where the end walls meet the lateral walls.

13. The battery module according to claim 12, wherein:
- the at least three passages are first passages, and
- each first passage has a corresponding second passage formed nearby, where one of the first passage or the second passage is directed toward one of the two lateral walls and the other one of the first passage or second passage is directed toward one of the two end walls.

14. The battery module according to claim 9, wherein:
- the battery cells are prismatic battery cells having a cell thickness, a cell height, and a cell width,
- the cell thickness is smaller than the cell height, and
- the battery cells are arranged in alignment in a direction of the cell thickness.

15. The battery module according to claim 9, wherein:
- the cover is made of a synthetic material, and
- the cover includes a main section and a foldable section coupled to the main section, the foldable section being configured to swivel between a closing position and an opening position.

16. A system comprising a plurality of battery modules according to claim 9, wherein:
- the battery modules are arranged side by side, and
- one of the at least three passages of a first battery module of the battery modules is opposite to one of the at least three passages of a second battery module of the battery modules neighboring to the first battery module, the system further comprising:
- a connection element conductively connecting one of the first or second connecting piece of the first battery module and one of the first or second connecting piece of the second battery module.

* * * * *